United States Patent [19]

Tarrant

[11] 4,043,446

[45] Aug. 23, 1977

[54] CONVEYOR

[75] Inventor: William P. Tarrant, Saratoga Springs, N.Y.

[73] Assignee: Tarrant Manufacturing Company, Saratoga Springs, N.Y.

[21] Appl. No.: 675,132

[22] Filed: Apr. 8, 1976

[51] Int. Cl.² .............................................. B65G 19/00
[52] U.S. Cl. .................................................... 198/728
[58] Field of Search ............... 198/728, 731, 733, 725, 198/716

[56] References Cited

U.S. PATENT DOCUMENTS 3,113,663  12/1963  Kitson ................................... 198/733

FOREIGN PATENT DOCUMENTS 940,576  2/1956  Germany .............................. 198/731
1,025,287  4/1966  United Kingdom ................. 198/733

Primary Examiner—Evon C. Blunk
Assistant Examiner—Douglas D. Watts
Attorney, Agent, or Firm—Walter F. Wessendorf, Jr.

[57] ABSTRACT

Discloses a conveyor, adapted to be driven by drive means, for continuous and positive conveying of material. The conveyor comprises driven chains, adapted to be driven by the drive means, spaced-apart, rigid bar flights carried cross-wise by and relative to the driven chains, and angularly arranged and disposed chains carried between the rigid bar flights. The rigid bar flights and angularly arranged chains between such rigid bar flights cooperate to effect continuous and positive conveying of the material.

8 Claims, 4 Drawing Figures

CONVEYOR

This invention relates to a conveyor for use in continuously and positively conveying material, and inclusively conveying such material at low-delivery settings, such as salt, sand, cinders, and the like, to be disposed, scattered or spread on roads and highways, or for use in similarly conveying materials, such as fertilizers, and the like, for agricultural applications.

Conventional conveyors in this prior art employ rigid bar flights carried normal to and cross-wise to the driven chains to convey such material that is disposed, scattered or spread on roads and highways. Such rigid bar flights must be spaced sufficiently apart in order to afford some degree of flexibility to the driven chains carrying the rigid bar flights.

Problems are encountered, however, when such a conventional rigid bar-flight conveyor is utilized to convey such material from the dump truck or hopper thereon for highway applications at low-delivery settings. Low-delivery settings are necessary where the vehicle carrying the material must be driven at a slow rate of speed for salting and/or sanding – and when pavement conditions call for a low-delivery rate of application, i.e., while going through a city or highly traffic-congested area and when such vehicle is employed both for plowing and salting and/or sanding at the same time. At such necessary low-delivery settings, the conventional bar-flight conveyor conveys such material non-uniformly in discrete lumps with the undesired result that such material is non-uniformly spread or scattered on the road or highway leaving thereby patches of icy road surface which are untreated and hence hazardous.

To correct the problems of such untreated and hazardous patches of icy road surface resulting from low-delivery settings of such a conventional, rigid bar-flight conveyor, two courses of action are currently followed: either to treat the route again with such material or a sufficient number of times to minimize the possibility of any part of the icy road surface not remaining untreated, or to apply heavy quantities of such material to attempt to achieve such desired result.

Both described courses of action waste material and time, are thereby expensive and ecologically damaging to the environment, as well.

Another approach to attempt to correct the described problems resulting from the required low-delivery settings to convey such material is to employ an auger-type conveyor to effect continuous and positive conveying of such material regardless of speed. This approach is plagued by a different problem, in that if the material to be conveyed has a tendency to pack — such type of material having such tendency being wet sand, bank-run sand, sand and salt mixture, and sand with ethyl-glycol — the auger will form a tunnel under such type of material load. Such type material thus forms a bridged condition of such material over the auger which prevents conveying of such material by the auger. Hence, to effect continuous and positive conveying when employing the auger-type conveyor, such packed material load must be completely broken up before same can be conveyed. To attempt to render such material in a condition suitable of being conveyed by an auger-type conveyor, rotating finger-agitators are utilized to attempt to break up such packed material to render same suitable for conveying.

In the conventional conveyor employing rigid bar flights carried by and disposed normal to the driven chains, another problem is encountered when the material, during the act of conveying, is pushed toward and into such driven chains causing malfunction and accelerated wear thereby of such driven chains, and the packing of such material into the sprocket-driven chains.

The objects of this invention are to contribute to the solution of the discussed problems of the art and inclusively to effect continuous and positive conveying of the material regardless of conveying speed.

The conveyor of this invention employs spaced-apart, rigid bar flights carried by sprocket-driven chains. And flexible chains, angularly-spaced, are carried between and by such rigid bar flights. Such angularly-spaced, flexible chains permit the rigid bar flights to be spaced apart a greater distance than the rigid bar flights of the conventional conveyor.

In both the conveyor of this invention and the conventional, rigid bar-flight conveyor, one of the functions of the rigid bar flights is to maintain the spacing between the sprocket-driven chains to prevent such sprocket-driven chains from being pulled off their sprockets.

The conveyor of this invention is operationally stronger than the conventional, rigid bar-flight conveyor because the flexible chains, angularly-spaced and carried between and by this invention's rigid bar flights, reinforce such rigid bar flights by sharing the loads and forces acting upon that part of the conveyor under its "load-side" run.

The reason why, in the conveyor of this invention, the material is continuously and positively conveyed is because the material is not only picked up and conveyed by the leading edges of the rigid bar flights but also by the cooperating, angularly-spaced flexible chains between such rigid bar flights which also pick up and convey such material, as well, resulting in uniform pickup and conveying of such material.

The reason why, in the conveyor of this invention, there is less likelihood of malfunction and wear of the sprocket-driven chains which carry the rigid bar flights is because the angularly-spaced, flexible chains pick up and clear away material from such sprocket-driven chains with the result that such material being conveyed can not be pushed toward and into such sprocket-driven chains which carry the rigid bar flights.

The conveyor of this invention not only is substantially less expensive than, but also has far-greater wearing qualities than, a rubber-belt or nylon-belt type conveyor because the conveyor of this invention is made of steel whose material costs are cheaper, and the fabrication of the conveyor of this invention is simple compared with the complex fabrication involved in making the rubber-belt or nylon-belt type conveyor, and the wearing quality of steel is far greater than rubber or nylon.

Another important cost-comparison factor that must be considered is that when a portion of a belt-over-chain or straight-belt conveyor is torn, such belt-over-chain or straight-belt conveyor is thereby rendered inoperative and must be replaced; whereas, in the conveyor of this invention, only the broken individual flexible chains between the rigid bar flights needs to be replaced, and which replacement can be effected simply, easily, quickly and at relatively little cost.

Less power is required to drive the conveyor of this invention than is required to drive a belt-over-chain or straight-belt type conveyor,. The reason for this is because in a belt-over-chain or straight-belt conveyor, either of them is subjected to material load throughout either of their total topside "load-run" areas, thereby requiring comparatively more power to drive than the conveyor of this invention whose material load that is required to be power-driven is the material load engaged by the leading edges of the rigid bar flights and engaged by the angularly-spaced, flexible chains between such rigid bar flights.

Accordingly, these objects and other objects of the invention contributing to the solution of the problems of the prior art should be discerned and appreciated by reference to the detailed specification taken in conjunction with the drawings, wherein like reference numerals refer to similar parts throughout the several views, in which.

To facilitate the understanding of the invention, a nomenclature list is herewith provided:

| | |
|---|---|
| 1 | generally refers to the invention |
| 3 | hopper |
| 5 | dump truck |
| 7 | chute |
| 9 | spinner |
| 11 | endless pintle chain |
| 13 | pintle chain link |
| 15 | rigid bar flight |
| 17 | interior lateral side of pintle chain link 13 |
| 19 | straight link side chain |
| 21 | indication of welding |
| 23 | arrow indication of direction of movement |
| 25 | drive sprocket |
| 27 | arrow indication of direction of movement |
| 29 | dump truck |
| 31 | chute |
| 33 | arrow indication of direction of movement |
| 35 | idler sprocket |
| 37 | dump truck |
| 39 | chute |
| 41 | spinner |
| 43 | drive sprocket shaft |
| 45 | arrow indication of direction of movement |
| 47 | hopper |
| 49 | truck |
| 51 | drive sprocket |
| 53 | arrow indication of direction of movement |
| 55 | chute |
| 57 | spinner |
| 59 | drive sprocket shaft |
| 61 | power source |
| 63 | arrow indication of direction of movement |
| 65 | idler sprocket shaft |

Figure 1:
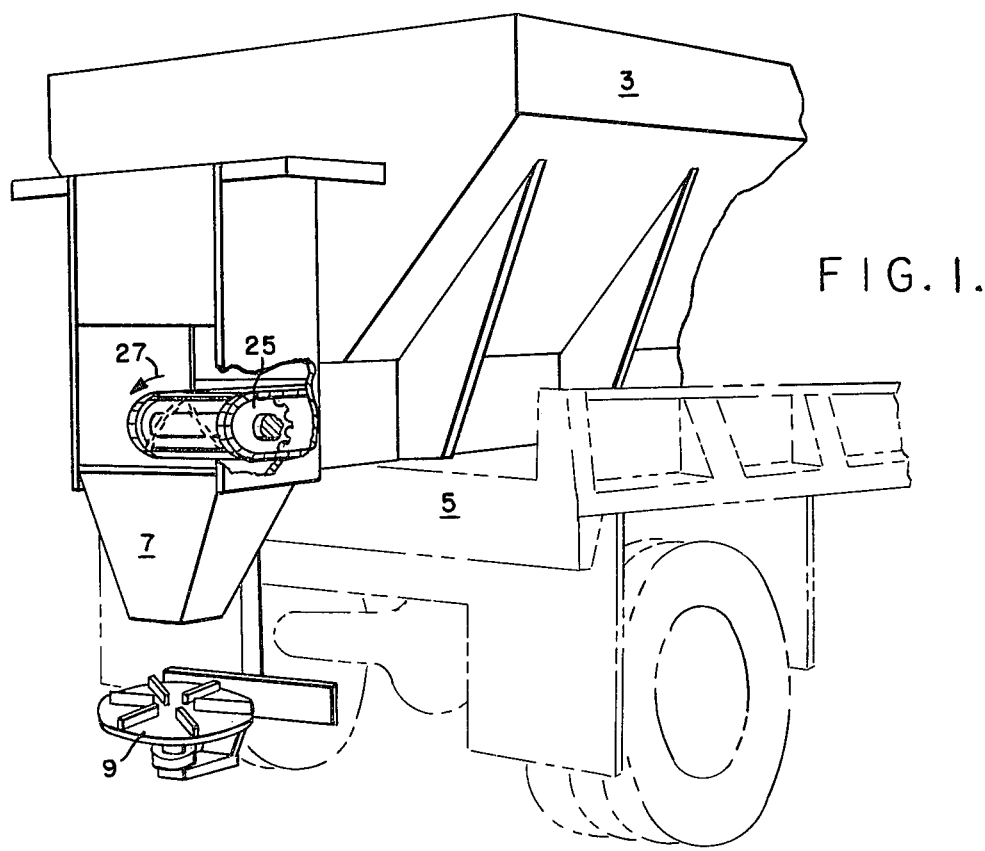
FIG. 1 is a view of an end spreader and hopper on a dump truck, with which the conveyor of this invention is utilized.
Figure 2:
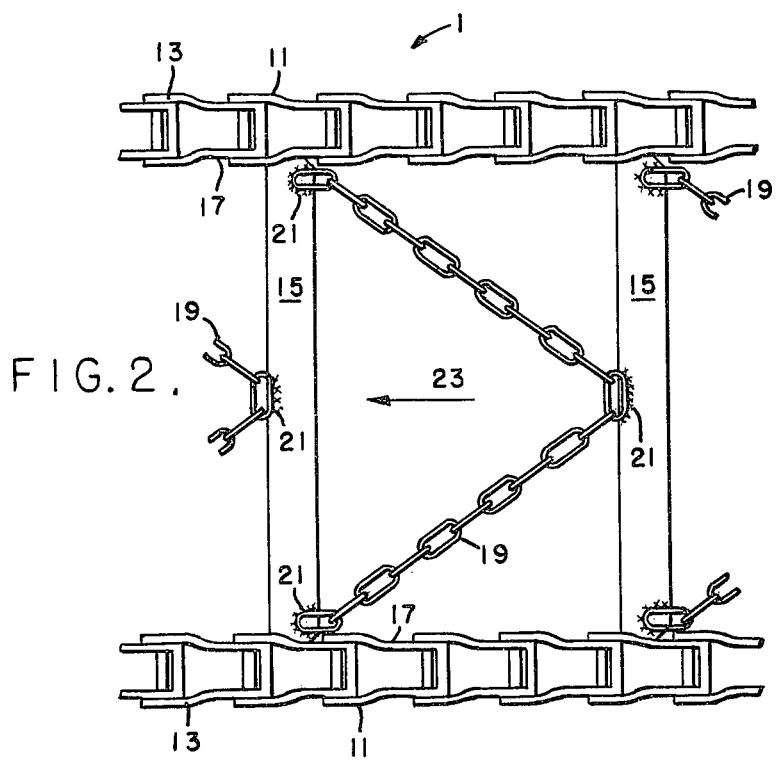
FIG. 2 is a view of a portion of the conveyor of this invention.

The conveyor of this invention, generally referred to be reference numeral 1 in FIG. 2 of the drawings, is shown in FIG. 1 as being disposed longitudinally relative to the hopper 3 that is mounted on a dump truck 5 to convey material from hopper 3 to chute 7 whereby such material is directed downwardly to spinner 9 for scattering and spreading on the highway.

Conveyor 1 comprises endless pintle chains 11, each of which has interconnected pintle chain links 13, as shown. Endless pintle chains 11 are shown and described with reference to this invention. However, any suitable flexible members can be utilized in place of the pintle chains 11 so long as suitable drive can be transmitted to such flexible members. Examples of suitable flexible members to which drive can be transmitted are roller chains, block chains, cables, etc.

Spaced-apart, rigid bar flights 15 are carried by the endless pintle chains 11 by being welded to the interior lateral sides 17 of the pintle chain links 13.

Straight link side chains 19, angularly arranged and disposed between the rigid bar flights 15, as shown, are fixed to their respective rigid bar flights 15 by welding thereto as indicated by reference numeral 21.

Although straight link side chains 19 are shown and described with reference to this invention, suitable flexible members such as flexible cables can be utilized in place of the straight link side chains 19.

Arrow 23 in FIG. 2 indicates the direction of movement of conveyor 1.

In FIG. 1 of the drawings, drive sprockets 25, driven by a power source not shown, operatively engage endless pintle chains 11 to drive the conveyor in the direction of movement indicated by arrow 27.

Figure 3:
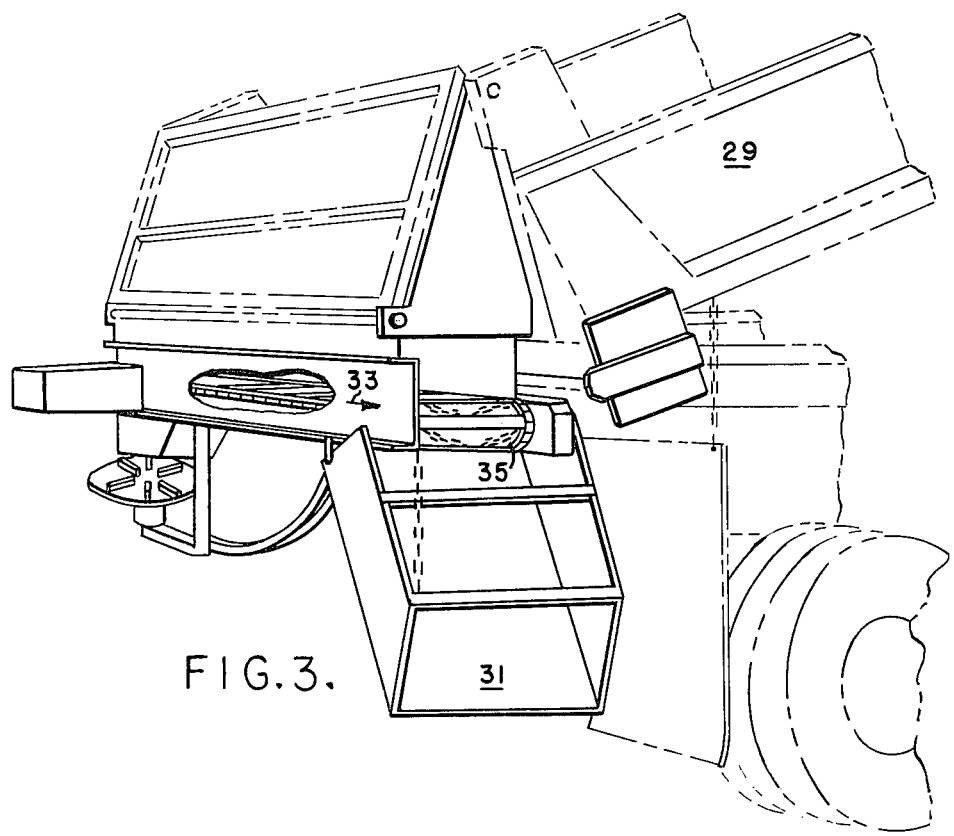
FIG. 3 is a view of the conveyor of this invention utilized at the rear of a dump truck for shoulder-fill operation with the chute directed to the shoulder of the road.

FIG. 3 of the drawings shows the conveyor 1 disposed cross-wise at the rear of a dump truck 29 for shoulder-fill operation to convey material from the dump truck 29 to chute 31 to direct thereby such material to the shoulder of the road. Drive sprockets driven by a power source, not shown, operatively engage the pintle chains 11 to drive the conveyor 1 in the direction of movement indicated by the arrow 33. The pintle chains 11 are trained around idler sprockets, one of which 35 is shown.

Figure 4:
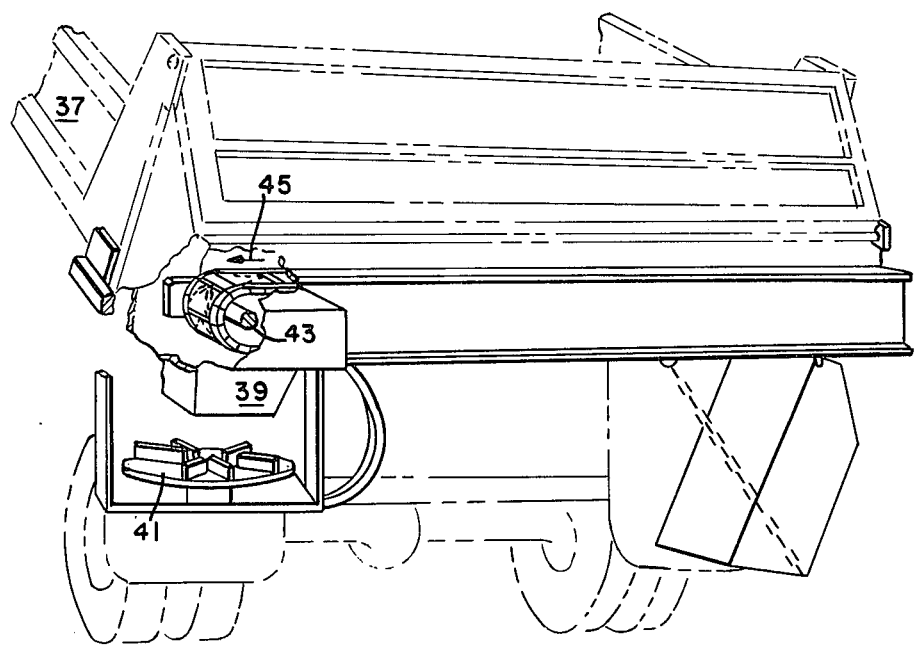
FIG. 4 is a view of the conveyor of this invention utilized with a spreader at the rear of a dump truck.

FIG. 4 of the drawings shows the conveyor 1 disposed cross-wise at the rear of a dump truck 37 for scattering and spreading material conveyed from dump truck 37 to chute 39 whereby such material is directed downwardly to spinner 41 for such scattering and spreading of such material on the highway. Drive sprockets whose drive sprocket shaft 43 is shown, driven by a power source, not shown, operatively engage the pintle chains 11 to drive the conveyor in the direction of movement indicated by the arrow 45.

Figure 5:
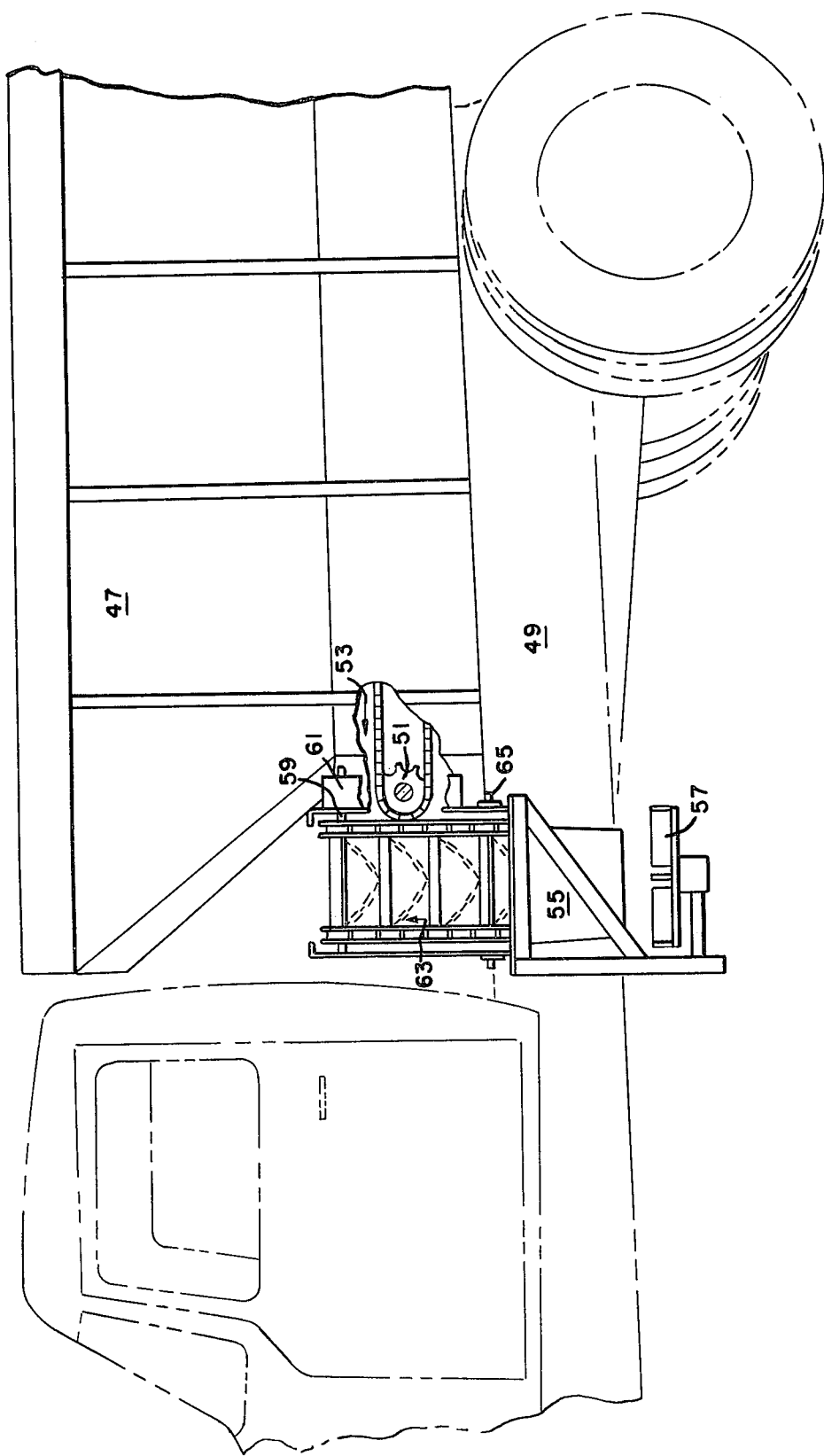
FIG. 5 is a view of a hopper on a truck with which a longitudinally disposed conveyor of this invention is utilized to convey material to a front, cross-wise disposed conveyor of this invention utilized to convey such material to a side spinner.

FIG. 5 of the drawings shows a first conveyor of this invention disposed longitudinally relative to a hopper 47 mounted on a truck 49 to convey material from hopper 47 to a second conveyor of this invention.

Drive sprockets 51, one of which is shown, driven by a power source, not shown, operatively engage the pintle chains 11 of the first conveyor to drive the first conveyor in the direction of movement indicated by the arrow 53.

The second, cross-wise conveyor, in turn, conveys such material to a chute 55 whereby such material is directed downwardly to a spinner 57 for scattering and spreading of such material on the highway.

Drive sprockets whose drive sprocket shaft 59 is shown, driven by a power source 61, operatively engage the pintle chains 11 of the second conveyor of this invention to drive same in the direction of movement indicated by the arrow 63. The pintle chains 11 of this second conveyor are trained around idler sprockets whose idler sprocket shaft 65 is shown.

The means shown and described herein to transmit drive to the conveyor of this invention has been by power-driven sprockets with such conveyor trained around idler sprockets or sets of idler sprockets. A drum-type roller can be utilized in place of such idler sprockets, or drum-type rollers can be utilized in place of the sets of idler sprockets.

With further reference to FIG. 5 of the drawings, it should be noted that the second conveyor's pintle chains 11 are trained around third and fourth sets of idler sprockets that are not shown.

From the detailed description afforded herein of the conveyor of this invention, more particularly shown and described with reference to FIG. 2, and with the functional applications of the conveyor of this invention having been shown and described in FIGS. 1, 3, 4 and 5, the objects of this invention in contributing to the solution of the discussed problems of the prior art should now have been readily discerned and appreciated.

Having thusly described my invention, I claim:

1. A conveyor, adapted to be driven by drive means, for uniform, continuous and positive conveying of material, said conveyor comprising: first flexible means, a plurality of rigid means and a plurality of second flexible means; said first flexible means being adapted to being driven by said drive means, said first flexible means carrying said rigid means, said rigid means being disposed substantially normal to said first flexible means, said rigid means carrying therebetween said second flexible means, each of said second flexible means being angularly disposed relative to said rigid means, each of said second flexible means being carried substantially at the lateral sides of said rigid means and substantially at intermediate portions of the next adjacent rigid means, and said rigid means and said second flexible means cooperating to uniformly, continuously and positivelt convey said material, and said second flexible means cooperating to clear away said material being conveyed from said first flexible means thereby preventing said material being conveyed from entering and packing into said first flexible means to thereby prevent malfunction of said conveyor, and said second flexible means cooperating with said rigid means respecting the spatial relationship of said rigid means to render said conveyor more flexible, and, respecting that part of said conveyor under its said load run and said second flexible means and rigid means of said part of said conveyor, said second flexible means of said part of said conveyor under its said load run cooperating to reinforce said rigid means of said part of said conveyor under its said load run by cooperatively sharing the loads and forces acting upon said part of said conveyor under its said load run.

2. A conveyor in accordance with claim 1, wherein said first flexible means comprises flexible members.

3. A conveyor in accordance with claim 1, wherein said first flexible means carries said rigid means crosswise with respect to said first flexible means.

4. A conveyor in accordance with claim 1, wherein said rigid means is in spaced-apart relationship.

5. A conveyor in accordance with claim 1, wherein said first flexible means carries said rigid means crosswise with respect to said first flexible means and wherein said rigid means is in spaced-apart relationship.

6. A conveyor in accordance with claim 1, wherein said first flexible means comprises chains.

7. A conveyor in accordance with claim 1, wherein said rigid means comprises rigid bar flights.

8. A conveyor in accordance with claim 1, wherein said second flexible means comprises chains.

* * * * *